United States Patent
Gratzer

(10) Patent No.: US 6,684,991 B1
(45) Date of Patent: *Feb. 3, 2004

(54) ROTATIONAL SPEED DIFFERENTIAL HYDRAULIC CLUTCH HAVING CONTROL VALVES

(75) Inventor: Franz Gratzer, Stallhofen (AT)

(73) Assignee: Steyr-Daimler-Puch Fahrzeugtechnik AG & Co KG, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 10/110,352

(22) PCT Filed: Oct. 12, 2000

(86) PCT No.: PCT/AT00/00264
§ 371 (c)(1),
(2), (4) Date: Apr. 10, 2002

(87) PCT Pub. No.: WO01/27487
PCT Pub. Date: Apr. 19, 2001

(30) Foreign Application Priority Data

Oct. 12, 1999 (AT) .................................................. 703/99

(51) Int. Cl.⁷ ............................................. F16D 43/28
(52) U.S. Cl. .................................... 192/35; 192/103 F
(58) Field of Search ................. 192/35, 103 F, 192/85 AA

(56) References Cited

U.S. PATENT DOCUMENTS

| | | | | |
|---|---|---|---|---|
| 3,800,930 A | * | 4/1974 | Sommer ................. | 192/104 F |
| 3,894,446 A | * | 7/1975 | Snoy et al. ................ | 475/88 |
| 4,581,895 A | * | 4/1986 | Kress ...................... | 60/485 |
| 4,719,998 A | * | 1/1988 | Hiramatsu et al. ....... | 192/103 F |
| 4,727,966 A | * | 3/1988 | Hiramatsu et al. ........ | 477/35 |
| 4,924,989 A | * | 5/1990 | Filderman ............... | 192/103 F |
| 5,197,583 A | * | 3/1993 | Sakai et al. .............. | 192/35 |
| 5,536,215 A | * | 7/1996 | Shaffer et al. ............ | 475/88 |
| 5,611,746 A | * | 3/1997 | Shaffer .................... | 475/88 |
| 5,827,145 A | * | 10/1998 | Okcuoglu ................. | 475/88 |
| 5,964,126 A | * | 10/1999 | Okcuoglu ................. | 74/650 |
| 6,041,903 A | * | 3/2000 | Burns et al. ............. | 192/85 AA |
| 6,120,408 A | * | 9/2000 | Yates et al. .............. | 475/231 |
| 6,196,368 B1 | * | 3/2001 | Eibler ...................... | 192/35 |
| 6,250,444 B1 | * | 6/2001 | Gratzer .................... | 192/35 |
| 6,484,856 B1 | * | 11/2002 | Gratzer .................... | 192/35 |

FOREIGN PATENT DOCUMENTS

| | | | |
|---|---|---|---|
| DE | 198 54 867 A1 | * | 6/1999 |
| EP | 0 926 378 A2 | * | 6/1999 |

* cited by examiner

*Primary Examiner*—Rodney H. Bonck
(74) *Attorney, Agent, or Firm*—Bachman & LaPointe, P.C.

(57) ABSTRACT

A speed-difference-dependent hydraulic clutch comprises a drive housing (27), which rotates in a housing (25) that is fixed in space and forms a reservoir, a hydrostatic displacement machine (35), an output shaft (30), a friction clutch (36) and a piston (5) for acting on the friction clutch (36), a pressure being produced in a pressure chamber (4) when a difference occurs between the speed of the drive housing (27) and that of the output shaft (30), this pressure giving rise to action upon the friction clutch (36). To achieve rapid control and adaption of the characteristic, the first and the second opening (9, 10) are each connected to the reservoir (8), via a first and second rotary input (13, 14) and a first and second controllable valve (15, 16) respectively, said valves being fixed to the housing, the first and second control valve (15, 16) being designed as controllable throttles, with the result that a control action takes place both at the respective supply side and at the discharge side of the displacement machine, irrespective of the direction of the differential speed.

9 Claims, 4 Drawing Sheets

ROTATIONAL SPEED DIFFERENTIAL HYDRAULIC CLUTCH HAVING CONTROL VALVES

The present invention relates to a speed-difference-dependent hydraulic clutch, comprising a drive housing, which rotates in a housing that is fixed in space and forms a reservoir for a working fluid, a hydrostatic displacement machine, which is accommodated in said drive housing, a drive shaft, a friction clutch for connecting the drive shaft to the drive housing and a piston for acting on the friction clutch, a pressure being produced in a pressure space when a difference occurs between the space of the drive housing and that of the drive shaft, this pressure giving rise to action upon the friction clutch, and the hydrostatic displacement machine having a first and a second opening for the supply and discharge of working medium and a third and fourth opening for connection to the pressure chamber.

Clutches of this kind are used in various configurations in the drive train of motor vehicles for direct transmission of a torque or locking a linked differential for the purpose of driving the wheels on one axle or distributing the drive torque between two axles. The hydrostatic displacement machine comprises an inner rotor and an outer rotor, for example, but it is equally possible to use hydrostatic displacement machines of some other kind. In either case, two parts (e.g. the drive housing and the output shaft) perform a relative motion when there is a speed difference and thus produce a pressure that acts on the piston of the friction clutch.

A clutch of this kind is known, for example, from U.S. Pat. No. 5,536,215. In this, a valve formed by a bimetallic leaf is provided between the pressure space and a space at low pressure, the clutch space, this valve being intended to compensate for temperature-dependent changes in the viscosity of the working fluid. There are no further control members.

U.S. Pat. No. 4,727,966 has disclosed another clutch of this kind in a somewhat different arrangement. Here, outflow openings with restrictions are provided between the third and fourth opening and the pressure space, allowing different response pressures for the two possible directions of the speed difference, i.e. a distinction between driving and overrun mode and forward and reverse travel.

In one embodiment (FIG. 7), control members have furthermore already been provided, namely further outflow valves, the response pressure of which can be controlled. The actuating signal for these valves is determined by a controller from a variety of operating variables. The control members are accommodated in the rotating part and the actuating signals, which are hydraulic in this case, must therefore be supplied to them via a rotary input. No means of influencing the pressure on the intake side of the displacement machine is provided. All this and, in addition, the action of the centrifugal force on the control members renders sensitive, accurate and rapid control impossible.

DE 198 54 687 A has disclosed another clutch of this kind in yet another arrangement, in which it is not the displacement machine but the pressure chamber itself that is connected by a rotary input to a control valve, the latter being fixed to the housing, for pressure modulation on the delivery side. This allows only imperfect control. To tow the vehicle away, for instance, the displacement machine must be completely depressurized, and this requires a valve on the intake side as well. Moreover, the valve arrangement requires the entire clutch unit to be constructed in a way that has many other disadvantages.

It is therefore the object of the invention to develop a clutch of the generic type in such a way that sensitive, accurate and rapid control and adaptation of the characteristic is assured with the minimum outlay.

SUMMARY OF THE INVENTION

The foregoing object is achieved by virtue of the present invention wherein the first and the second opening are each connected in terms of flow to the reservoir, via a first and second rotary input and a first and second valve respectively, the valves being fixed to the housing, and that the first and second valve are designed as controllable throttle valves, with the result that a control action takes place both at the supply side and at the discharge side of the displacement machine, irrespective of the direction of the differential speed.

Control valves are thus provided on the delivery and on the intake side on the shortest path to an from the displacement machine, allowing the clutch to be acted upon directly with very little delay in all conceivable driving states. Since these are controllable throttle valves, which are therefore arranged in the main flow, control can be exercised sensitively and accurately over the entire actuating range.

In addition, there are all the advantages of control valves that are arranged fixed to a housing: simplicity of connection to the control unit, no adverse effects due to centrifugal force, no limitation in overall size and ease of access. It also allows the working medium to be supplied and discharged on one side of the displacement machine, allowing small-diameter rotary joints to be provided in a relatively simple manner. The additional outlay for the rotary leadthrough is balanced by the elimination of the nonreturn valves that would be required in the same line without the two control valves.

In a preferred embodiment, the first and second valve form a common control valve. Apart from the consequent reduction in cost, this also ensures enhanced reliability without any loss of functionality in driving operation. Here, the first and second valve can be proportional valves or be activated by a stepping motor.

As a development of the invention, a double-acting non-return valve is provided between the third and fourth opening and the pressure chamber. Since with this valve one side is always open, the pressure space can be depressurized very rapidly via this valve and the control valve, this being advantageous particularly in the case of braking (ABS, ESP). Moreover, the valve can be accommodated in a particularly space-saving manner in the wall between the displacement machine and the pressure space. Owing to the fact that it is only a single valve with a switching element (ideally with a ball), a satisfactory transition from one mode of operation to the other is assured.

If a cooling passage leads into the clutch space from the displacement machine via a throttle valve, this ensures adequate lubrication and cooling of the clutch, promoting a rapid and crisp response from the latter.

An advantageous detail of the invention comprises the common control valve being formed by an actuating piston that can be displaced in a bushing, the bushing being connected in terms of flow to the reservoir at both ends and having a first and a second lateral control opening, one of which is connected to the displacement machine by the first opening and the other is connected to the displacement machine by the second opening (delivery side and intake side respectively), and the actuating piston closing the first and the second control opening, respectively, in its two end positions and closing the two control openings reciprocally to a greater or lesser extent in the intermediate positions. As a result, the degree to which the two valves open and close is interdependent, this being achieved with the minimum outlay in terms of construction. Economy of space and accessibility are further improved if the bushing of the control valve is arranged in a plane transverse to the axis of rotation of the clutch, in the region of the rotary inputs.

Another advantageous detail of the invention comprises the double-acting nonreturn valve between the displacement machine and the pressure chamber comprising a tangential hole in a plane transverse to the axis of rotation of the clutch and a closing body guided in said hole, the two ends of the tangential hole being connected to the third and fourth opening of the displacement machine and their center being connected to the pressure space. The valve is thus unimpaired by centrifugal force, while taking up the minimum of space.

BRIEF DESCRIPTION OF THE DRAWINGS

The invention is described and explained below with reference to figures, of which.

DETAILED DESCRIPTION

Figure 1:
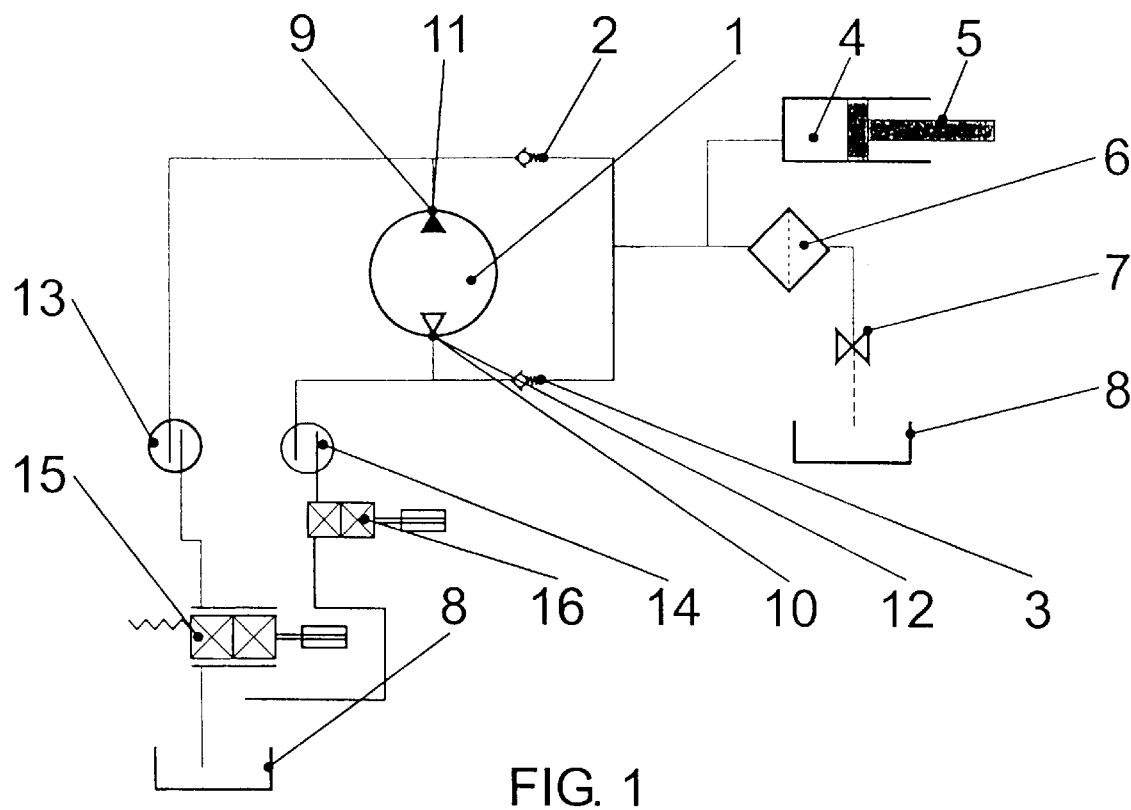
FIG. 1 shows a first schematic diagram of a clutch according to the invention.

FIG. 1 is only a schematic diagram, in which the hydrostatic displacement machine is denoted by 1 and its four openings are denoted by 9, 10, 11 and 12, being combined to some extent for the sake of simplicity. From these there is a connection via the obligatory nonreturn valves 2, 3 to a pressure chamber 4, which compresses a multi-plate clutch (not illustrated at this stage) by means of a piston 5. The connection to a reservoir 8 is established via a throttle valve 7 and, if appropriate, via a filter 6. The openings 9, 10 are connected by a first and second rotary input 13, 14 to a first and second control valve 15, 16.

Figure 2:
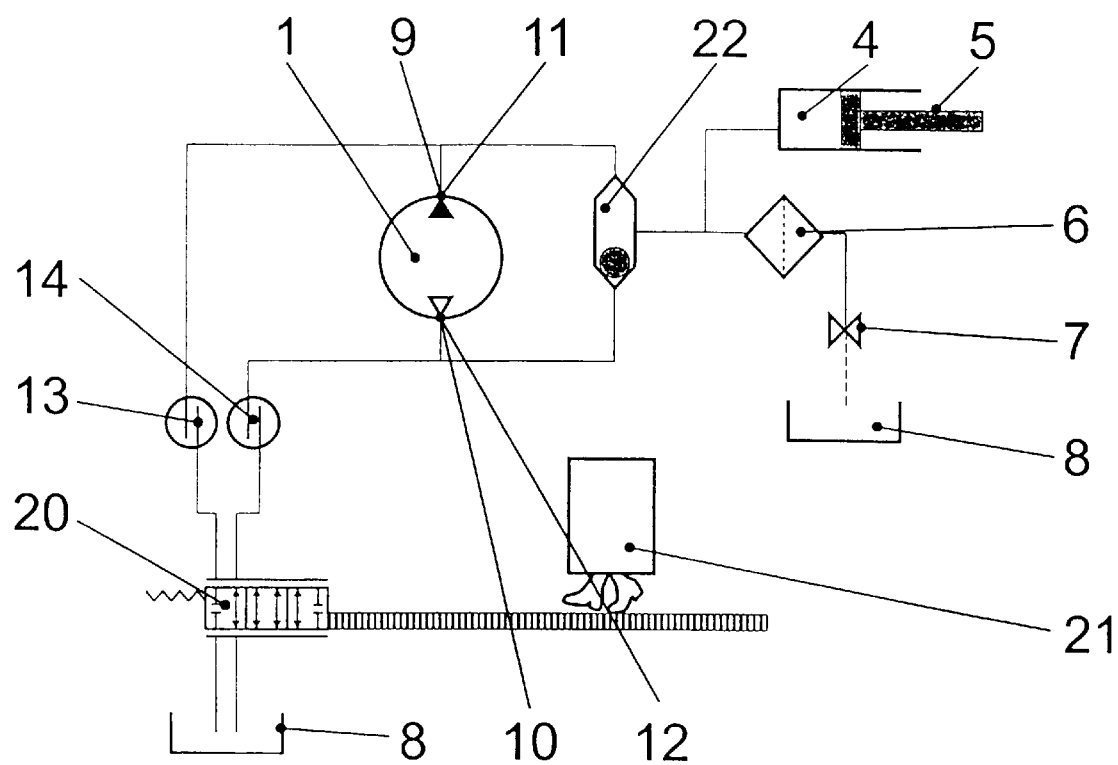
FIG. 2 shows a second schematic diagram of a variant embodiment of the clutch according to the invention.

The variant in FIG. 2 differs from the above only in that a common control valve 20 is provided instead of the two control valves and a common double nonreturn valve 22 is provided instead of the two nonreturn valves. The common control valve 20 is controlled by a stepping motor 21.

Figure 3:
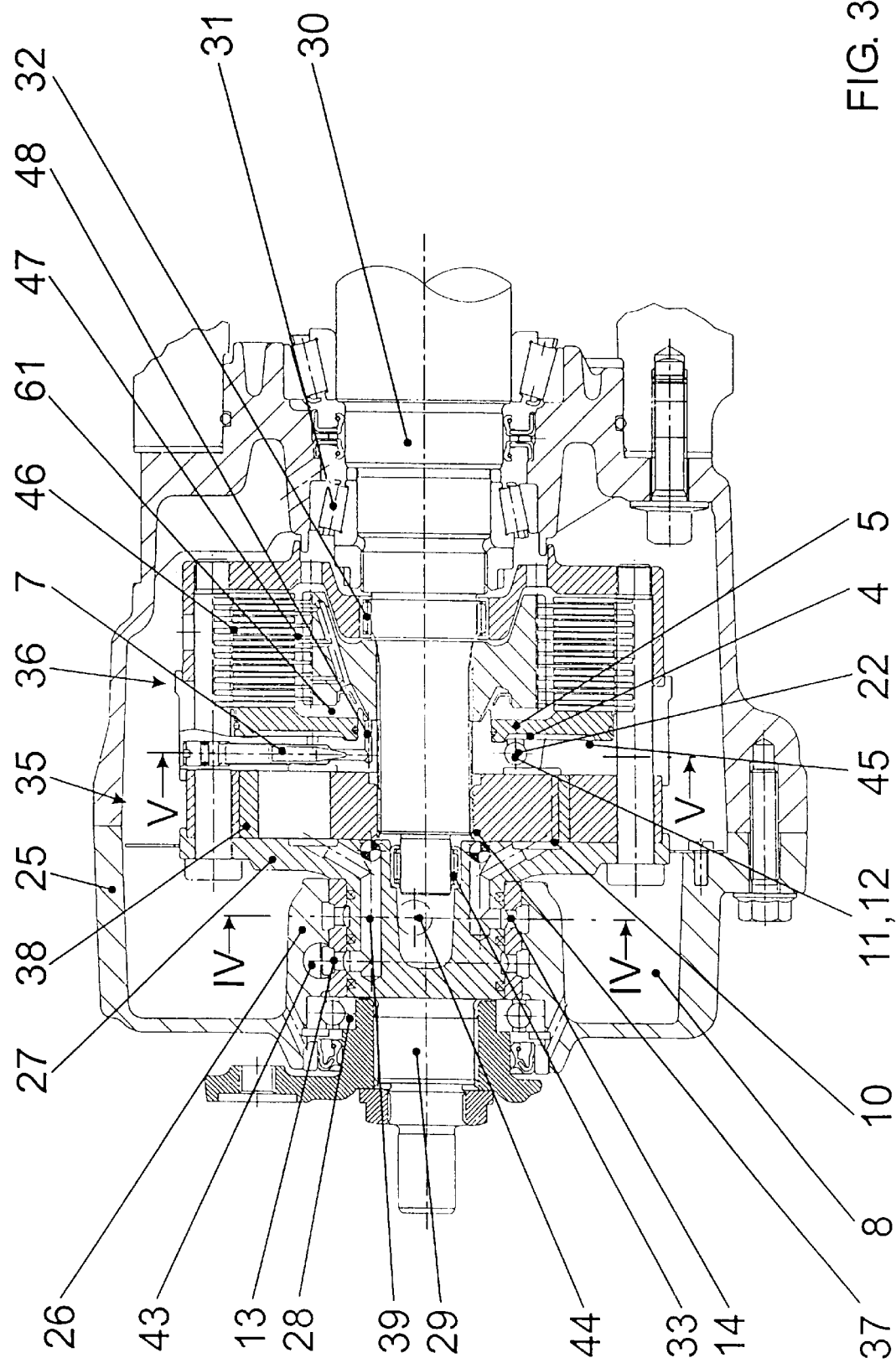
FIG. 3 shows a longitudinal section through a preferred embodiment of the invention.

In FIG. 3, the housing, which simultaneously forms the reservoir 8 for the working fluid, is denoted by 25 and a connecting flange by 26. Within this, there is a drive housing 27, which ends in a drive shaft 29 that is guided rotatably in the housing 25 by means of a bearing 28. On the side remote from the drive shaft 29, an output shaft 30 projects into the drive housing 27. It is supported in the housing 25 by means of a bearing 31. There are furthermore two needle bearings 32, 33 for mutual support between the drive housing 27 and the output shaft 30.

Within the drive housing 27 there is a hydrotatic displacement machine, denoted in general terms by 35, and a friction clutch 36, which is a multi-plate clutch of a type known per se. Here, the hydrostatic displacement machine 35 comprises an inner rotor 37, which is connected rotationally to the output shaft 30, and an outer rotor 38, which is freely rotatable in an eccentric manner in the drive housing. The two rotors 37, 38 have different numbers of intermeshing tooth-like structures.

On the side remote from the friction clutch 36, the drive housing 27 contains a first and a second opening 9, 10 and, on the side adjacent to the friction clutch 36, contains third and fourth openings 11, 12. A first connecting hole (or a plurality of successive holes) 39 leads from the first opening 9 to a first rotary input 13 between the drive housing 27 and housing 25. A second connecting hole 41 leads from the second opening 10 to a second rotary input 14, which is arranged axially offset relative to the first rotary input.

A first branch passage 43 and a second branch passage 44 lead from the two rotary inputs 13, 14 to the common control valve 20 (not shown), which is arranged in the connecting flange 26 of the housing 25, i.e. in the nonrotating part. The third and fourth openings 11, 12 are in an intermediate plate 45, which is part of the drive housing 27 and which is adjoined directly by the hydrostatic displacement machine 35. Also located in the intermediate plate 45 is the common nonreturn valve 22 and the throttle valve 7.

On the opposite side of the intermediate plate 45 from the hydrostatic displacement machine there is first of all the pressure chamber 4 and then the piston 5, which presses the clutch plates 46, 47 together when the pressure chamber 4 is subjected to pressure. The clutch plates 46 are connected in a rotationally fixed but axially displaceable manner to the drive housing 27, and the clutch plates 47 are connected in a rotationally fixed but axially displaceable manner to the output shaft 30.

Figure 4:
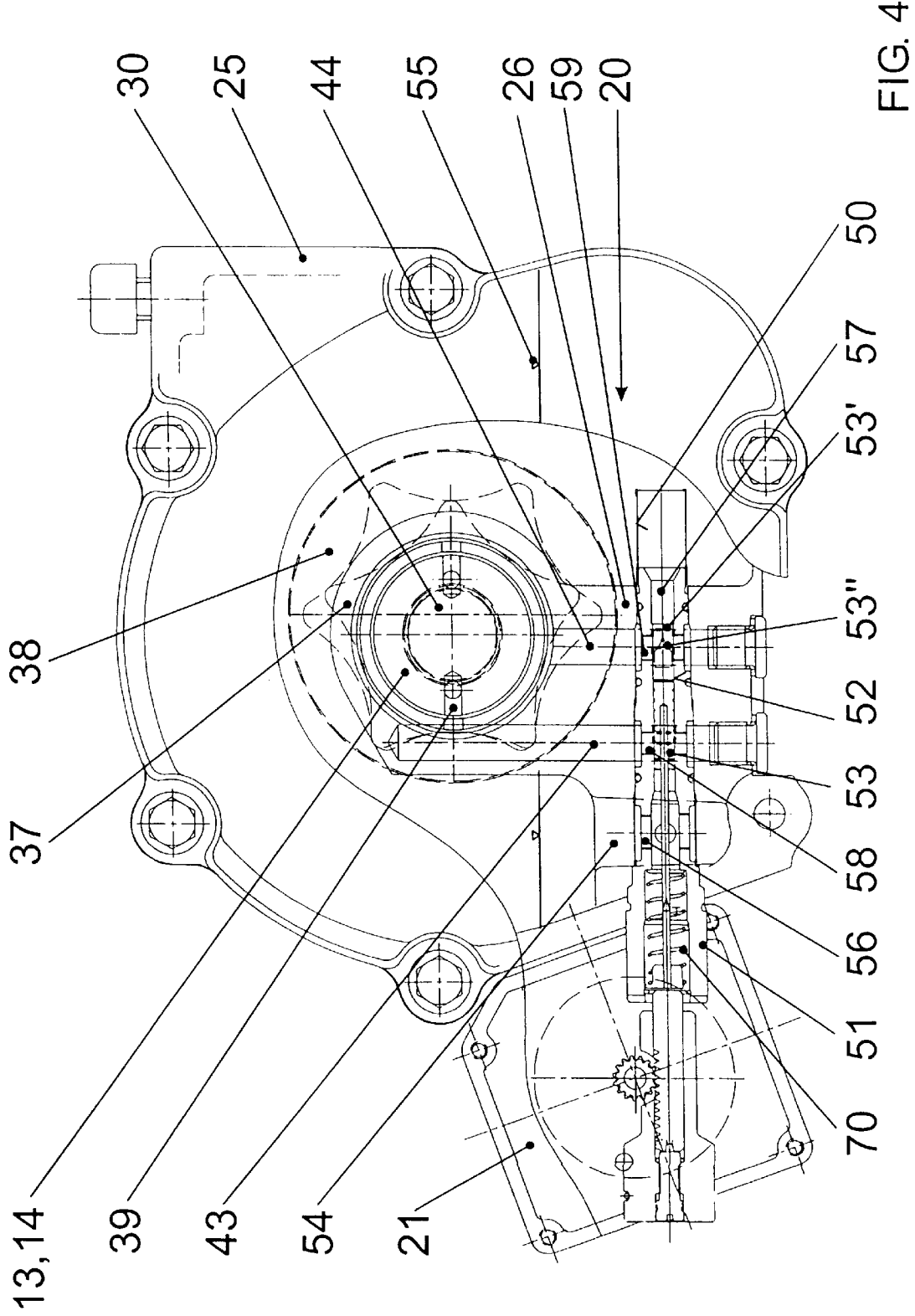
FIG. 4 shows a view from the front, partially broken away.

FIG. 4 shows, in particular, the common control valve 20, which is accommodated in a valve bore 50 in the connecting flange 26. It comprises a bushing 51, which is inserted and screwed into the valve bore 50 and has a cylindrical bore 52 in which an actuating piston 53 can be adjusted by means of the stepping motor 21. The connecting flange 26 has a depression 54, by means of which the connection to the working fluid in the reservoir is established on one side via a first inlet opening 56, possibly via a filter. At the other end of the bushing 51, the working fluid has free access to the cylinder bore 52 via a second inlet opening 57. The approximate oil level is indicated and denoted by 55.

Between the two inlet openings 56, 57, the bushings 51 has two lateral control openings. The first control opening 58 is connected to the first branch passage 43, while the second control opening 59 is connected to the second branch passage 44 (see FIG. 3). The control openings 58, 59 do not necessarily have to be cylindrical; they can be adapted to more refined control requirements by modifying their shape. Also provided is a spring 70, which moves the piston 53 automatically into the position shown on the extreme left in special situations.

The operation of the valve 22 will now be explained with reference to the three indicated positions of the actuating piston 53. In position 53 (solid line), the first control opening 58 is completely closed and the second control opening 59 is completely open. In position 53' (broken lines), the first control opening 58 is completely open and the second control opening 59 is completely closed. In position 53" (broken lines), both control openings 58, 59 are partially open. The effect of these valve positions depends on the direction of the speed difference in the hydrostatic displacement machine and thus on the driving state:

A) Forward driving mode: the adjusting piston is in the center position 53". The second control opening 59 is open (to a greater or lesser extent) and acts as an intake opening, and the first control opening 58 is likewise partially open, acting as a delivery opening, and the actuating piston is in position 53". In this position, the characteristic of the clutch is gentle, e.g. for maneuvering and cornering on the road. If the clutch is supposed to be stiff for higher traction, i.e. to transmit a high torque, e.g. when off-road or when the wheels are spinning, the actuating piston is moved into position 53, in which the first control opening 58 is closed.

B) Forward overrun mode: during overrun braking, the first control opening 58 is open (this being now delivery side) and the second control opening 59 is largely closed, while the actuating piston is in position 53'. If anti-lock braking occurs, the second control opening 59 is opened quickly, this being assisted by the spring, and the actuating piston is then in position 53.

C) Reverse driving mode: the second control opening 59 is closed, the first control opening 58 is open and the actuating piston is between positions 53' and 53" in the control mode.

D) Reverse overrun mode: both openings 58, 59 are partially open, corresponding to position 53" of the actuating piston.

E) Forward tow-away: the first control opening must be open and the second control opening 59 (corresponding to the intake side) must be largely closed to avoid the occurrence of drag resistance when being towed away.

Figure 5:
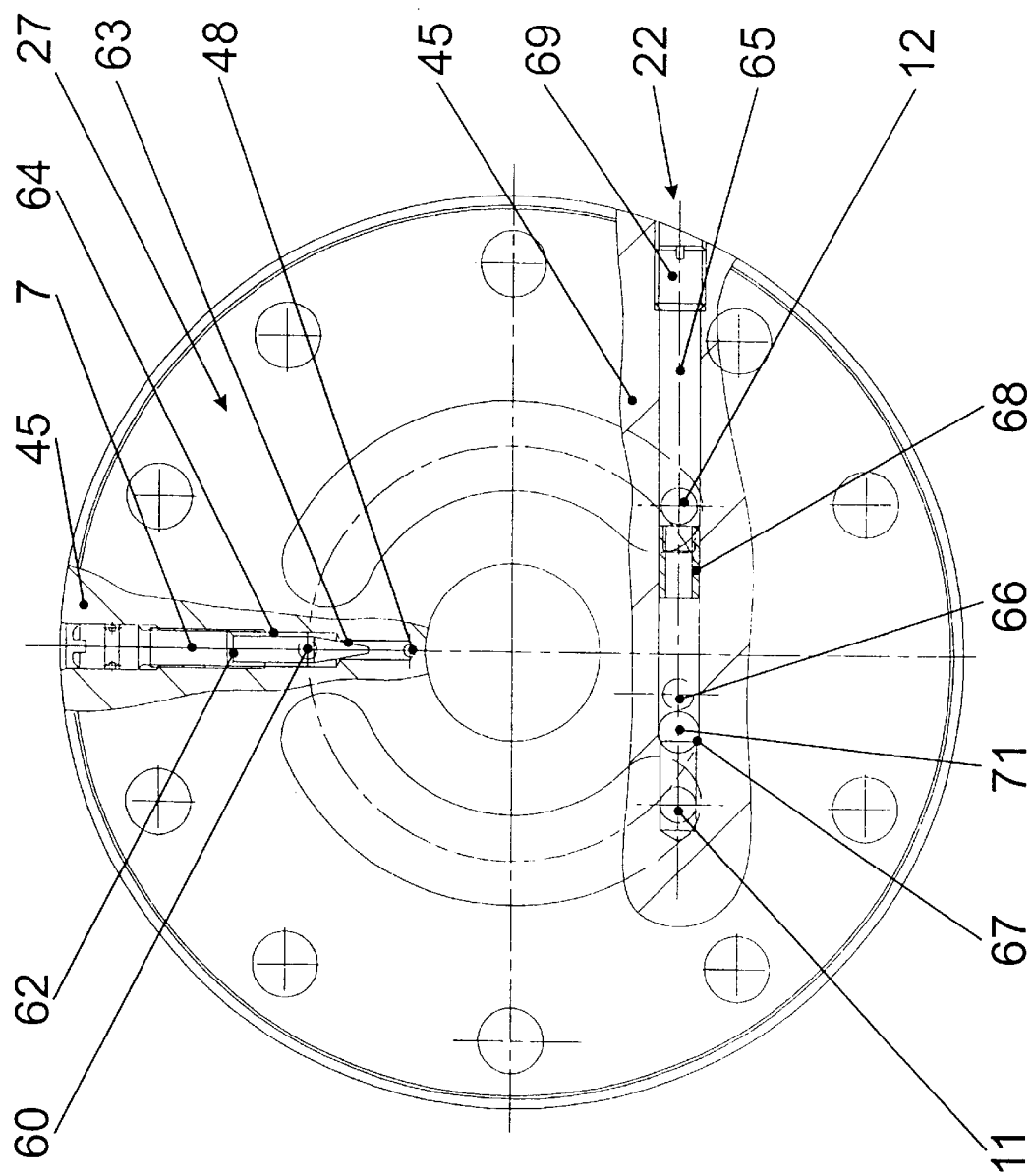
FIG. 5 shows a front view of the intermediate plate 45 (FIG. 3), partially broken away.

FIG. 5 shows two further valves, the throttle valve 7 and the common double-acting nonreturn valve 22. Both are accommodated in the intermediate plate 45 (see also FIG. 3). From the pressure space 4, pressure medium passes through the connecting hole 60 into the throttle-valve bore 64, into which a throttling pin 62 is screwed in an adjustable manner. Together with the throttle-valve bore 64, this pin forms a restriction 63, adjoining which on the inside is a cooling passage 48 that leads into the clutch space 61 (FIG. 3).

The common nonreturn valve comprises a tangential hole 65, which is closed pressure-tightly at one end by a plug 69, and a closing body 61, which can move therein. The third and fourth openings 11, 12 of the hydrostatic displacement machine 35 open into the tangential hole 65. On one side, between these openings 11, 12, there is a stop shoulder 67 and, on the other side, there is a screwed-on stop ring 68. The closing body 71, in this case a ball, can move backward and forward between these two stops 67, 68.

Approximately in the center between the two end positions of the closing body 71 there is a through-opening 66, which establishes the connection with the pressure chamber 4. Depending in which of the two openings 11, 12 the pressure is higher, the ball 71 assumes a position in which one of the two openings 11, 12 is connected to the inlet opening 66. This provides the double-acting nonreturn valve 22.

What is claimed is:

1. A speed-difference-dependent hydraulic clutch, comprising a drive housing (27), which rotates in a housing (25) that is fixed in space and forms a reservoir for a working fluid, a hydrostatic displacement machine (35), which is accommodated in said drive housing, an output shaft (30), a friction clutch (36) for connecting the output shaft (30) to the drive housing (27) and a piston (5) for acting on the friction clutch (36), a pressure being produced in a pressure chamber (4) when a difference occurs between the speed of the drive housing (27) and that of the output shaft (30), this pressure giving rise to action upon the friction clutch (36), and the hydrostatic displacement machine (35) having a first (9) and a second (10) opening (9, 10) for the supply and discharge of working medium and a third (11) and fourth (12) opening (11, 12) for connection to the pressure chamber (4), wherein the first and the second opening (9, 10) are each connected in terms of flow to the reservoir (8), via a first and second rotary input (13, 14) and a first and second control valve (15, 16) respectively, said valves being fixed to the housing (25), the first and second control valve (15, 16) comprise controllable throttle valves, with the result that a control action takes place both at the respective supply side and at the discharge side of the displacement machine, irrespective of the direction of the differential speed.

2. The speed-difference-dependent hydraulic clutch as claimed in claim 1, wherein the first and the second control valve (15, 16) form a common control valve (20).

3. The speed-difference-dependent hydraulic clutch as claimed in claim 2, wherein the common control valve (20) is formed by an actuating piston (53) that can be displaced in a bushing (51), the bushing having inlet openings (56, 57) to the reservoir (8) at both ends and having a first (59) and a second (58) lateral control opening (58, 59), one (59) of which is connected to the displacement machine (35) by the second inlet opening (57) and the other (58) is connected to the displacement machine (35) by the first inlet opening (56), and the actuating piston (53) closing the first (58) and the second (59) control opening, respectively, in its two end positions (53, 53") and closing the two control openings (58, 59) reciprocally to a greater or lesser extent in the intermediate position (53').

4. The speed-difference-dependent hydraulic clutch as claimed in claim 3, wherein the bushing (51) of the control valve (20) is arranged in a plane transverse to the axis of rotation of the clutch, in the region of the rotary inputs (13, 14).

5. The speed-difference-dependent hydraulic clutch as claimed in claim 1, wherein the first and the second control valve (15, 16) are proportional valves.

6. The speed-difference-dependent hydraulic clutch as claimed in claim 1, wherein the first and the second control valve (15, 16; 20) are activated by a stepping motor (21).

7. The speed-difference-dependent hydraulic clutch as claimed in claim 1, wherein a double-acting nonreturn valve (22) is provided between the third and fourth opening (11, 12) and the pressure chamber (4).

8. The speed-difference-dependent hydraulic clutch as claimed in claim 7, wherein a cooling passage (48) leads into the clutch space (61) from the displacement machine (35) via a throttle valve (7).

9. The speed-difference-dependent hydraulic clutch as claimed in claim 7, wherein the double-acting nonreturn valve (22) between the displacement machine (35) and the pressure chamber (4) comprises a tangential hole (65) in a plane transverse to the axis of rotation of the clutch and a closing body (71) guided in said hole, the two ends of the tangential hole (65) being connected to the third and fourth opening (11, 12) of the displacement machine (35) and to the pressure chamber (4).

* * * * *